(12) United States Patent
Baker et al.

(10) Patent No.: US 8,167,620 B1
(45) Date of Patent: May 1, 2012

(54) TEAM ROPING TRAINING APPARATUS

(76) Inventors: James Baker, Jourdanton, TX (US);
John R. Ray, Big Foot, TX (US)

( * ) Notice: Subject to any disclaimer, the term of this patent is extended or adjusted under 35 U.S.C. 154(b) by 640 days.

(21) Appl. No.: 12/245,372

(22) Filed: Oct. 3, 2008

(51) Int. Cl.
G09B 19/00 (2006.01)

(52) U.S. Cl. ......... 434/219; 434/225; 482/115; 482/120

(58) Field of Classification Search .................. 434/219, 434/225; 482/115, 120
See application file for complete search history.

(56) References Cited

U.S. PATENT DOCUMENTS

| | | | | |
|---|---|---|---|---|
| 2,819,900 | A * | 1/1958 | Brackett | 273/366 |
| 3,902,480 | A * | 9/1975 | Wilson | 482/7 |
| 4,353,546 | A | 10/1982 | Rhoades | |
| 4,460,065 | A * | 7/1984 | Saxer | 187/278 |
| 4,469,324 | A * | 9/1984 | Dolan | 482/7 |
| 4,470,373 | A | 9/1984 | Kesler | |
| 4,678,184 | A * | 7/1987 | Neiger et al. | 482/4 |
| 4,738,223 | A * | 4/1988 | Andreasen | 119/839 |
| 5,230,676 | A * | 7/1993 | Terauds | 482/53 |
| 5,573,486 | A * | 11/1996 | Beliakov | 482/120 |
| 5,732,648 | A * | 3/1998 | Aragon | 114/254 |
| 6,945,534 | B1 * | 9/2005 | Lindsey | 273/359 |
| 7,086,991 | B2 * | 8/2006 | Williams et al. | 482/37 |
| 7,101,186 | B1 | 9/2006 | Hughes | |
| 2004/0101811 | A1 | 5/2004 | Gipson | |

* cited by examiner

Primary Examiner — Gene Kim
Assistant Examiner — Joseph B Baldori

(57) ABSTRACT

A team roping training apparatus that comprises a motor having a motor shaft, a spool having a spool shaft, and a switch to selectively energize the motor. The spool is selectively rotatable with the motor shaft such that when rotation of shaft is impeded through a roper's grasping of an attached rope, the spool is disengaged form the motor shaft. According to the preferred embodiment, such selective rotation is accomplished with a clutch mechanically coupling the spool shaft with the motor shaft.

13 Claims, 3 Drawing Sheets

12
TEAM ROPING TRAINING APPARATUS

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to team roping. More specifically, the invention is a team roping training apparatus that allows a team roper to realistically simulate the act of "taking a daily" around a saddle horn, which is an important step of roping a steer.

2. Description of the Related Art

A roping team is composed of two members, each mounted on horseback. During competition, a steer is freed from a pen, after which the team members follow in close pursuit with the objective of roping and immobilizing the animal. One team member, the header, must rope the steer around its horns and then "take a dally," which is a couple of wraps of the rope around the horn of the saddle. Once the header has made his daily, the other team member, the heeler, throws a loop of rope under the running steer's hind legs and also dallies tight around the saddle horn. Both horses then back up to stretch out the steer's hind legs, thus immobilizing the animal. The team that does this most quickly wins.

Because fractions of a second can determine the outcome of the competition, perfecting the technique of dallying, and developing the necessary muscle memory and dexterity for proper dallying through repetitive action, are goals sought by both novice and experienced ropers. An inability to properly and quickly take a dally can also lead to injury. Moreover, aspiring ropers want to make efficient use of whatever practice time they have.

There are other inventions that provide practice means for headers and heelers. For example, U.S. Pat. No. 7,101,186 relies upon a non-motorized recoil mechanism that cannot be shut off once activated. The device utilizes a standard clutch that slowly retracts a line, but does not completely disengage the recoiling mechanism. U.S. Patent Application 2004/0101811 discloses a simulated steer and horse with the steer propelled along a straight path. While the device is motorized and useful for practicing a daily, it is limited in use due to its large and cumbersome nature and multitude of parts. Moreover, the invention disclosed by the '811 application only allows one practice daily per run. Neither of these inventions, taken either individually or in combination, discloses all of the limitations of the present invention as claimed.

BRIEF SUMMARY OF THE INVENTION

The present invention is a team roping training apparatus that comprises a motor having a motor shaft, a spool having a spool shaft, a rope connected to the spool, and a switch to energize and de-energize the motor. The spool is selectively rotatable with the motor shaft such that when rotation of the spool shaft is impeded through a roper's grasping of the rope, the spool is disengage from the motor shaft. According to the preferred embodiment, such selective disengagement is accomplished with a clutch mechanically coupling the spool shaft with the motor shaft.

DETAILED DESCRIPTION OF THE INVENTION

The present invention is an apparatus for realistically practicing taking a dally when roping a steer, without the need to use live steers. The invention enables both experienced and novice ropers to perfect their dallying technique through many repetitions in a short period of time. The present invention also allows a roper to practice a series of dallies before resetting the apparatus to its initial state. Moreover, the application provides a safe and reliable mechanism to accomplish these goals.

Figure 1:
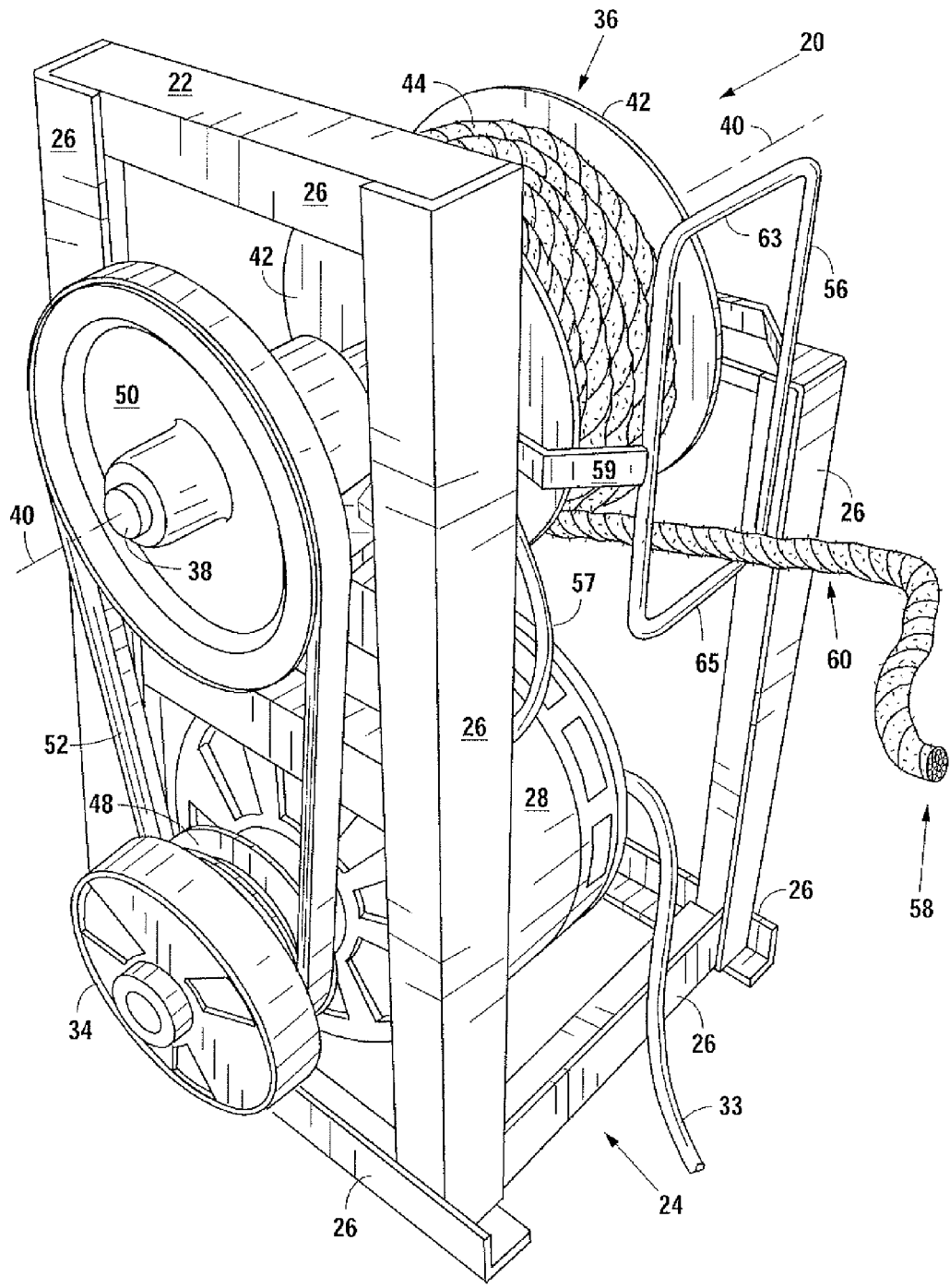
FIG. 1 is a perspective view of the preferred embodiment of the team roping training apparatus.
Figure 2:
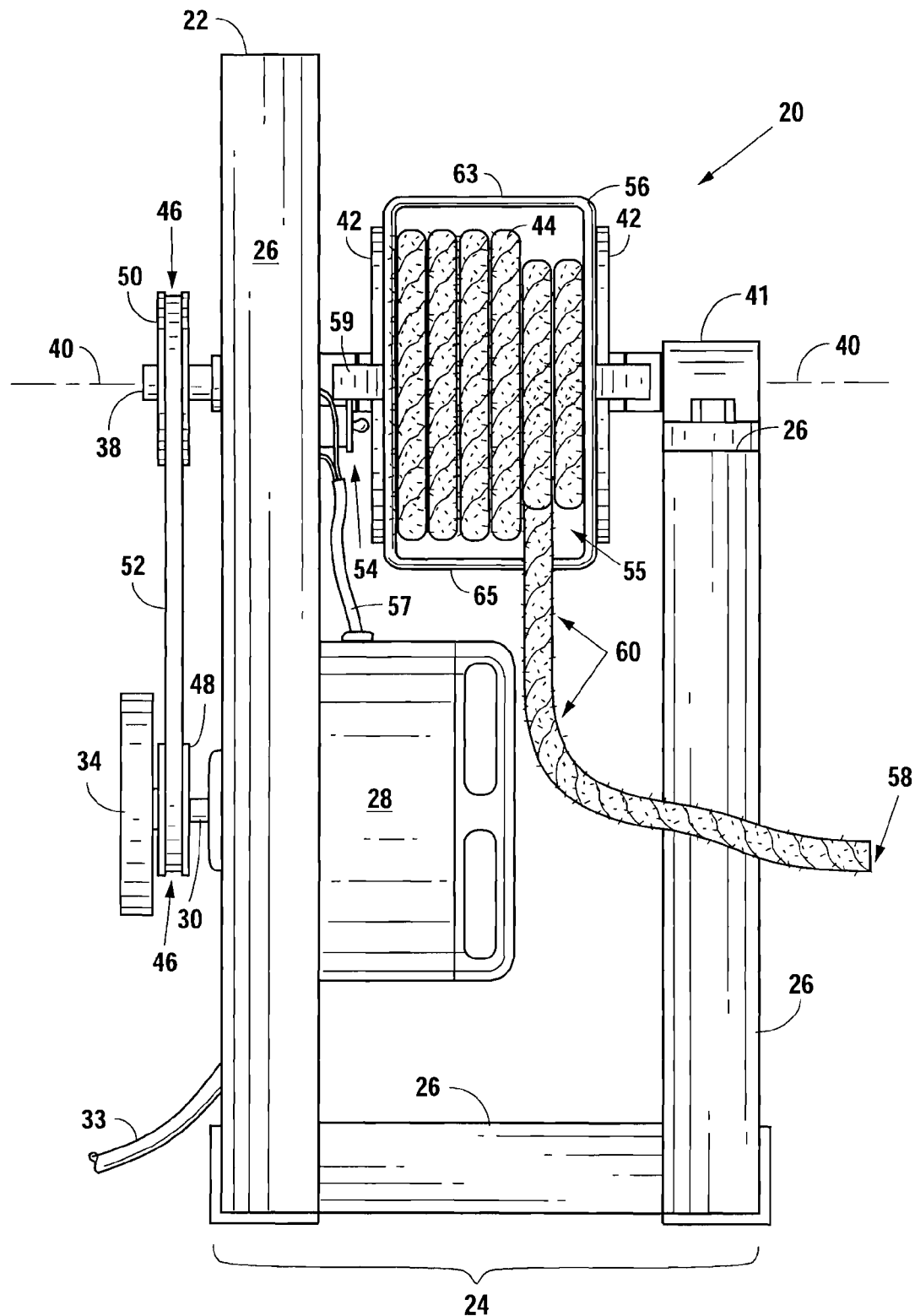
FIG. 2 is a front elevation of the preferred embodiment.

FIG. 1 and FIG. 2 in combination disclose the preferred embodiment 20 of the present invention, which includes a frame 22 having a base area 24 for supporting the other components of the invention. The frame 22 is heavy and durable, which is desirable in order that the frame 22 can adequately support the other components while being relatively difficult to move, as during use the apparatus is preferably immobile. In the preferred embodiment, the frame 22 is constructed of connected steel vertical and horizontal framing members 26, although any durable, rigid material may be used. In alternative embodiments, the frame 22 may include slots (not shown) for anchoring to a structure or fixture to enhance immobility, and the apparatus may be elevated such that the base area 24 does not contact a floor surface during normal use.

A motor 28 having a shaft 30 is mounted to the frame 22 so that a substantial portion of the motor 28 occupies the framed volume. The motor 28 preferably operates off of a 110V AC supply, such as a standard North American wall outlet, connected via cord 33. In the preferred embodiment, the motor 28 generates ⅓ hp at 1075 rpm. The motor shaft 30 extends from the motor 28 to outside the framed volume and drives an input of a clutch 34, which in the preferred embodiment is a centrifugal clutch typically used for a go-kart.

A spool 36 having a spool shaft 38 is connected to the frame 22 and positioned in the framed volume. The spool shaft 38 is mounted such that its longitudinal axis 40 extends between both sides of the frame 22. The non-driven end of the spool shaft 38 is connected to a pillow block bearing 41 mounted to the frame 22.

Two end plates 42 of the spool 36 define a volume in which an attached rope 44 may be coiled about the spool 36. The end plates 42 impede longitudinal coiling about the spool 36 to prevent irregular coiling during use.

Although not shown specifically in the figures, connection of the rope 44 to the spool 36 may be accomplished in any number of ways. In the preferred embodiment, the rope 44 is nylon and disposed through a hole in one of the end plates 42. The nylon end may thereafter be attached by applying heat to cause the end to melt, which expands the end to larger than the hole, thereby securing the rope in a manner sufficient for normal use of the apparatus. In one alternative embodiment, the rope 44 is connected to the spool 36 with a safety lanyard that fails—thus detaching the rope 44 from the spool 36—in the event the rope 44 is completely uncoiled.

In both the preferred and referred-to alternative embodiments, the detachable connection of the rope 44 provides a safety feature should the roper's horse spook while the roper has taken a dally and the roper is unable to quickly release that dally. This detachable connectability helps prevent entanglement by and injury to both the roper and the horse.

A belt-and-pulley system 46 connects the clutch 34 with the spool shaft 38 to cause selective rotation of the spool 36 with the motor shaft 30. In the preferred embodiment, a first pulley 48 is coupled to the output of the clutch 34 and a second pulley 50 is coupled to the spool shaft 38. First and second pulleys 48, 50 are coupled with a belt 52 such that rotation of the first pulley 48 causes corresponding rotation of the second pulley 50, which in turn causes rotation of the spool shaft 38 and connected spool 36.

A switch 54 having an actuator 56 is mounted to the frame 22 proximal to the spool 36 and electrically coupled to the motor 28 through a cable 57. When in the "on" position and the motor 28 is connected to a power source, the motor 28 is energized. When in the "off" position, the motor 28 is de-energized. The switch 54 is preferably oriented so the actuator 56 moves upwardly and downwardly relative to the ground, and so that moving the actuator 56 upwardly energizes the motor 28, and moving the actuator 56 downwardly de-energize the motor 28.

In the preferred embodiment, the actuator 56 is a loop having a loop volume 55 so that the free end 58 of the rope 44 can be disposed through the actuator 56 to the roper.

Figure 3A:
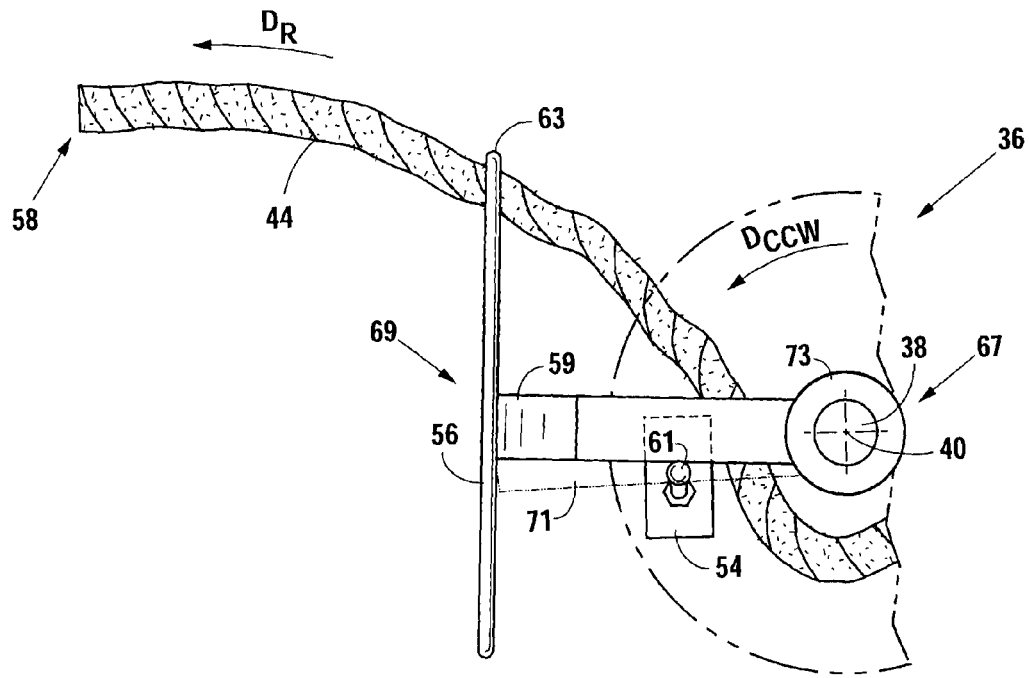
FIG. 3A and FIG. 3B are side partial sectional views of the rope, spool, and switch of the preferred embodiment.
Figure 3B:
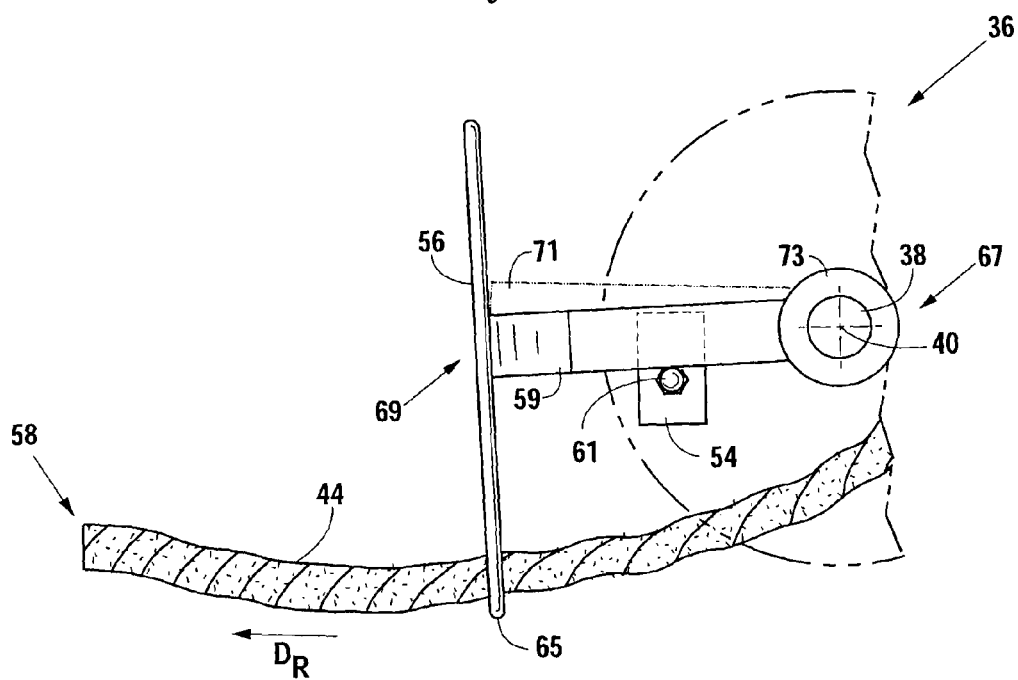

FIG. 3A and FIG. 3B are side elevations showing the actuator 56 of the preferred embodiment in the "on" and "off" positions. An actuator arm 59 is mechanically coupled to a toggle 61 through conventional connection means (e.g., fasteners, welding, etc.) so that movement of the actuator 56 causes corresponding movement of the toggle 61. FIG. 3A shows the switch housing 54 connected to the actuator 56 in the "up," or "on," position, wherein the motor 28 is energized and driving the spool shaft 38 in the counter-clockwise direction $D_{CCW}$. This counter-clockwise rotation of the spool shaft 38 causes corresponding rotation of the spool 36, which attempts to coil the rope 44 against any resistance from the roper. FIG. 3B shows the switch 54 connected to the actuator 56 in the "down," or "off," position, wherein the motor 28 is de-energized.

The actuator arm 59 has a first end 67 proximal to and rotatably connected to the spool shaft 38 and a second end 69 distal from the spool 36 terminating in the actuator 56, which defines the loop volume 55 (see FIG. 2). Rotation of the actuator arm 59 around the longitudinal axis 40 defines a partial shell of revolution 71 between the "up" position shown in FIG. 3A and the "down" position shown in FIG. 3B. The actuator arm has a hinge barrel 73 at the first end 67 that is concentrically aligned around the spool shaft 38 and longitudinal axis 40. As shown in both FIGS. 3A and 3B, the toggle 61 of the switch 54 intersects the partial shell of revolution 71 defined by the range of rotation of the actuator arm 59 between the "up" and "down" positions.

Use of the invention is initially described with reference to FIG. 1 and FIG. 2. Prior to use, the rope 44 is uncoiled from the spool 36 between the end plates 42. The roper is positioned facing the front side of apparatus, while grasping the free end 58 of the rope 44 that is extruded through the actuator 56. The placement of the roper is preferably the distance the roper would be from a steer after heading or heeling during an actual competition, and varies from roper to roper.

As shown in FIG. 3A, when the roper is ready to practice a daily or series of dallies, the roper lifts the free end 58 to cause the rope 44 to contact the upper bar 63 of the actuator 56, with the resulting upward movement of the actuator 56 to the "up" position thus toggling the switch 54 to the "on" position to energize the motor 28 (see FIGS. 1 and 2). After energizing, the motor shaft 30 (see FIG. 2) begins rotation and attempts to engage the clutch 34 to cause the spool 36 to "wind up" the rope 44 and pull the free end 58 away from the user.

To practice a daily or series of dallies, the roper resists the coiling of the rope 44, and instead pulls the rope 44 in the roper's direction $D_R$ to counteract the coiling force caused by attempted rotation of the spool 36. The coiling force caused by the spool 36 is sufficiently small that it can be resisted by an average or worse roper.

If the roper successfully restrains the free end 58, the clutch 34 slips, but will still exert a force on the spool 36 and attempt to coil the rope 44, which simulates the force that would be caused after having roped a steer during competition. By taking a daily against this force, the roper practices his or her dallying skills under realistic conditions.

The roper may thereafter release the daily, again let a length of rope 44 slip as if a steer had just been heeled, and then repeat the process of taking a daily. Each daily formed by the roper coils an additional length of rope 44 around the spool 36, and the roper may repeat the process until the length of uncoiled rope 44 is insufficient to take another daily. In the preferred embodiment, the length of the rope 44 is sufficient to take four or five dallies.

As shown in FIG. 3B, after the roper is done with a daily or series of dallies, the roper may de-energize the motor 28 by forcing the free portion of the rope 44 downward against a lower bar 65 of the actuator 56, which moves the switch 54 to the "off" position. In the preferred embodiment, simply dropping the uncoiled portion of the rope 44 is sufficient to force the actuator 56 downward by the weight of the rope 44 and move the toggle 61 to the "off" position, which is a safety feature should the operator unintentionally let go of the rope 44. Thereafter, the apparatus may be reset to its initial state by uncoiling the rope 44.

The present invention is described above in terms of a preferred illustrative embodiment of a specifically described team roping training apparatus. Those skilled in the art will recognize that alternative constructions of such an apparatus can be used in carrying out the present invention. Other aspects, features, and advantages of the present invention may be obtained from a study of this disclosure and the drawings, along with the appended claims.

We claim:

1. A team roping training apparatus comprising:
   a frame having a plurality of framing members defining a base area and a framed volume;
   a motor having a motor shaft, wherein said motor is mounted to said frame and occupies at least a portion of said framed volume;
   a spool having a spool shaft with a longitudinal axis, the spool shaft being in communication with said motor to selectively rotate with said motor shaft, wherein said spool is connected to said frame and occupies at least a portion of said framed volume;
   an actuator arm having a first end proximal to and rotatably connected to the spool and a second end distal from the spool connected to an actuator defining an actuator volume, wherein rotation of the actuator arm around said longitudinal axis defines a partial shell of revolution;
   a switch electrically coupled to said motor and intersecting said partial shell of revolution;

a rope having an attached end connected to said spool and a free end, wherein said rope is disposed through said actuator volume; and a clutch having an input connected to said motor shaft and an output in communication with said spool shaft.

2. The team roping training apparatus of claim 1 further comprising a detachable connection between said rope and said spool, said detachable connection operative to disconnect said rope from said spool upon application of a force to the attached end of said rope in a direction away from the spool when the rope is uncoiled from the spool.

3. The team roping training apparatus of claim 2 wherein said detachable connection comprises a safety lanyard connecting said rope to said spool.

4. The team roping training apparatus of claim 1 further comprising a belt-and-pulley system connecting said clutch to said spool shaft.

5. The team roping training apparatus of claim 4 wherein said belt-and-pulley system comprises:
   a first pulley connected to said clutch;
   a second pulley connected to said spool shaft; and
   a belt mechanically coupling said first pulley to said second pulley.

6. The team roping training apparatus of claim 1 wherein said clutch is a centrifugal clutch.

7. The team roping training apparatus of claim 1 wherein said actuator is movable from the off position to the on position by causing said rope to exert an upward force on said actuator, and said actuator is movable from the on position to the off position by exerting a downward force on said actuator.

8. The team roping training apparatus of claim 7 wherein said actuator is moveable to said off position from said on position by dropping said rope.

9. The team roping training apparatus of claim 1 wherein said switch comprises a toggle mechanically connected to said actuator with an actuator arm.

10. The team roping training apparatus of claim 1 wherein said actuator comprises an upper bar and a lower bar position on opposing sides of the rope.

11. The team roping training apparatus of claim 1 wherein said actuating arm comprises a hinge barrel at said first end, said hinge barrel concentrically aligned with the spool shaft.

12. The team roping training apparatus of claim 1 wherein the switch intersects the partial shell of revolution defined by said actuator arm.

13. The team roping training apparatus of claim 12 wherein said switch comprises a toggle intersecting the partial shell of revolution defined by said actuator arm.

\* \* \* \* \*